April 19, 1927. 1,625,521
O. BURGETT
GRAIN MIXING AND CHEMICAL TREATING MACHINE
Filed Sept. 26, 1925 2 Sheets-Sheet 1
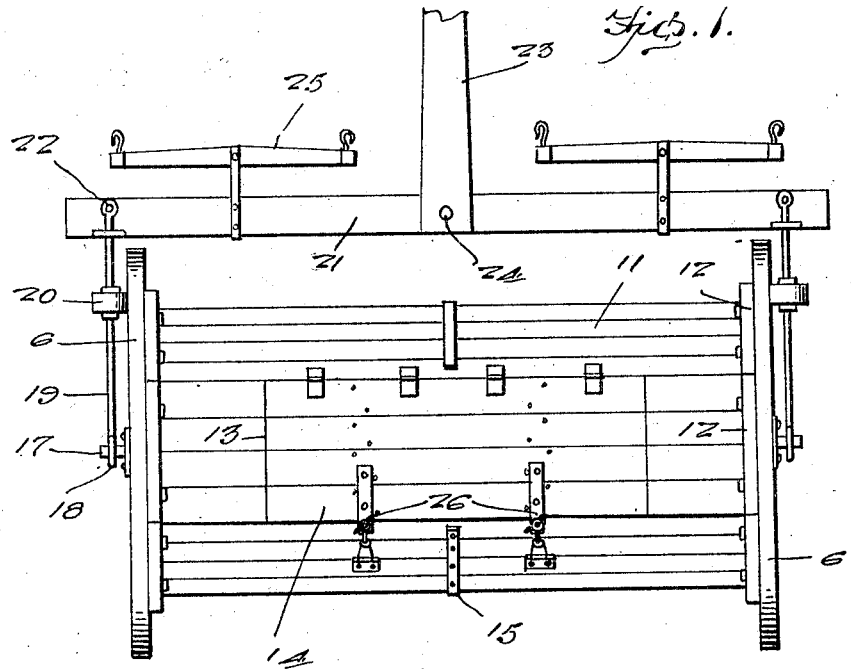
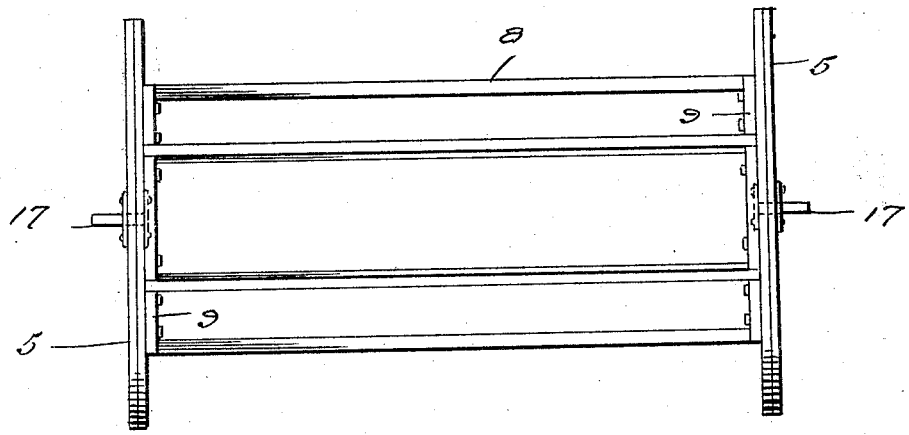
Inventor
O. Burgett
By Clarence A. O'Brien
Attorney

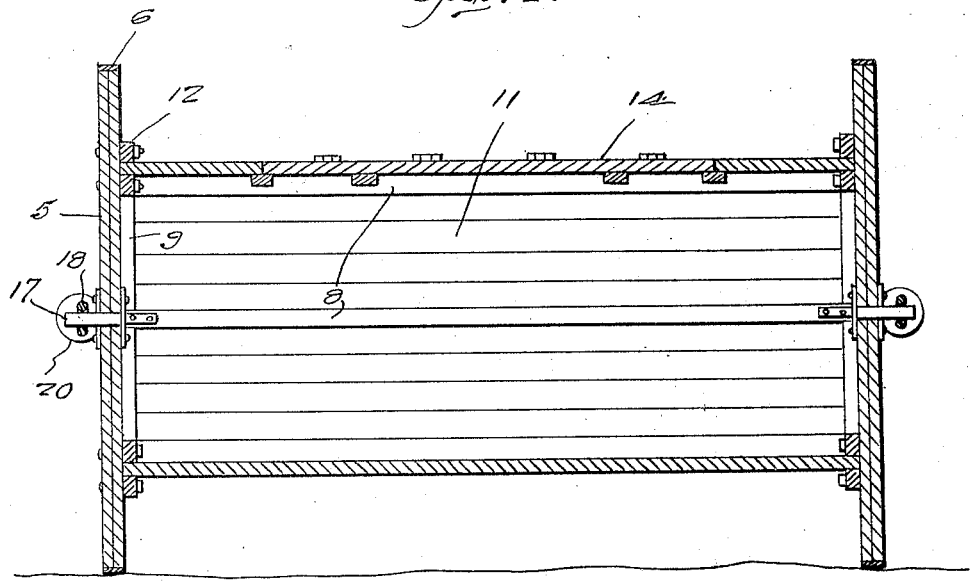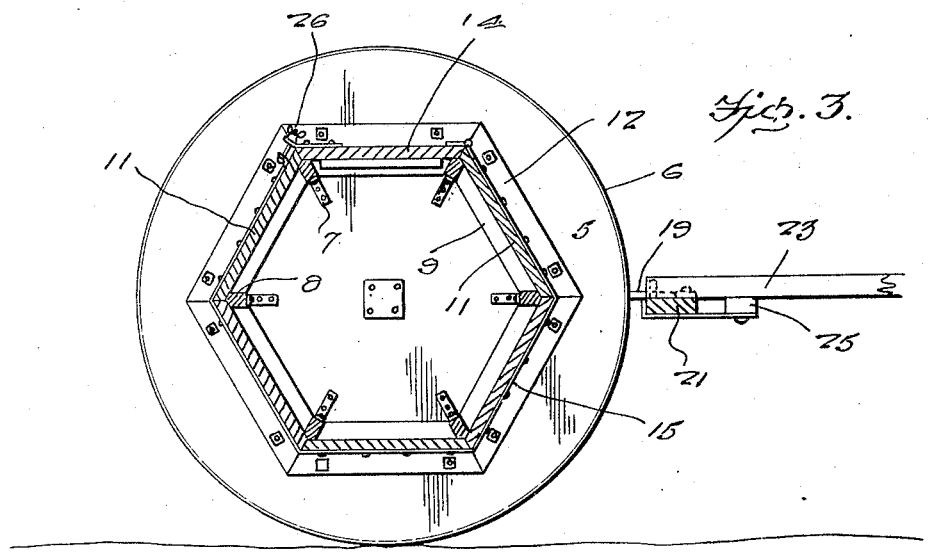

Patented Apr. 19, 1927.

1,625,521

UNITED STATES PATENT OFFICE.

ORR BURGETT, OF SCOBEY, MONTANA.

GRAIN-MIXING AND CHEMICAL-TREATING MACHINE.

Application filed September 26, 1925. Serial No. 58,887.

The present invention relates to a machine for mixing grain, feed, and the like, and treating said grain and feed with chemicals.

An important object of the machine is to provide a mixing receptacle operatively mounted on a pair of disks forming the sides of the receptacle and wheels and means associated with said wheels whereby the same may be rolled along the ground for rotating the receptacle. Said receptacle is adapted to receive the grain from the bin at which time suitable chemicals are placed in the receptacle and the machine may be used for hauling the grain to the desired point, where it is to be used and during the travel of the machine the grain and chemicals will be thoroughly mixed.

Another very important object of the invention is to provide a mixing machine of this nature which is of a comparatively simple construction, one which is thoroughly reliable and efficient in its operation, strong, and durable in use, convenient, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing

Figure 1 is a top plan view of a machine embodying the features of my invention, Fig. 2 is a transverse section taken therethrough, Fig. 3 is a longitudinal section taken therethrough, and Fig. 4 is an elevation of the skeleton of the machine.

Referring to the drawings in detail, it will be seen that numerals 5 designate two disks, each of which is preferably formed with two layers securely held together in any suitable manner. A rim 6 is disposed about the periphery of each disk 5. A plurality of brackets 7 are mounted on the inner surface of each disk and are arranged at equi-distances from the center of the disk and at equal intervals in respect to each other. A plurality of bars 8 extend from the brackets on one disk to the corresponding brackets on the other disk. A plurality of bars 9 extend between the ends of the bars 8 adjacent the brackets 7. Thus a skeleton frame is formed as is shown to advantage in Fig. 4.

A plurality of panels 11 are mounted on the bars 8 and 9 to form the sides of a polygonal container and are held in place by bars 12 engaged on the inner faces of the disks 5 so that the ends of the panels are held between bars 9 and 12. One of the panels 11 is provided with an opening 13 having a hinged lid 14 mounted therein, so that the grain and chemicals may be dumped into and from the receptacle.

A band 15 extends about all of the side panels 11 except that having the opening 13. Pintles 17 pierce the centers of the disks 5 and receive the loops 18 on the rear ends of rods 19. Rollers 20 are journaled on these rods 19 for engaging the outer surfaces of the disks 5 adjacent their peripheries. A beam 21 extends transversely in front of the receptacle and the disks and has the forward ends of the rods 19 engaged therewith as at 22. A draft tongue 23 is pivotally engaged with the center of the beam 21 as at 24. Suitable draft trees 25 are engaged with the beam 21, one to each side of the tongue 23.

By opening the lid 14, a suitable quantity of grain may be dumped into the receptacle from a bin and then the proper quantity of chemical may be placed therein. The lid is then closed and fastened by suitable means 26. Draft animals or a tractor may be hitched to the machine so that it may be hauled to the desired unloading place. During the travel of the machine the receptacle will turn over with the disk wheels 5 and the grain and chemicals will be thoroughly mixed. The polygonal formation of the receptacle will afford sufficient agitation means but the bars 8 will also function as agitators. The rollers 20 prevent the wabbling of the disks 5 and maintain the same true and further assist in eliminating excessive friction when the mixer is being turned by the draft appliances 21 and 23.

It is thought that the construction, operation, and advantages of this invention will now be clearly understood by those skilled in this art without a more detailed description thereof. The present embodiment of the invention has been disclosed merely by way of example since in actual practice it attains the features of advantage enumerated as desirable in the statement of the invention and the above description.

It will be apparent that numerous changes in the details of construction, and in the combination and arrangement of parts may be resorted to without departing from the spirit or scope of the invention as hereinafter claimed or sacrificing any of its advantages.

Having thus described my invention, what I claim as new is:—

1. In a mixing machine of the class described, a pair of ground engaging disks, a plurality of brackets arranged concentrically about the center of the inner surface of the disk and spaced at equal intervals from each other and spaced inwardly from the periphery of the disks, bars disposed between the brackets on the inner faces of the disks, bars extending between the brackets from one disk to the other, said bars and disks forming a skeleton frame for a polygonal receptacle, and panels mounted on said bars to form the sides of said polygonal receptacle.

2. In a mixing machine of the class described, a pair of ground engaging disks, a plurality of brackets arranged concentrically about the center of the inner surface of the disk and spaced at equal intervals from each other and spaced inwardly from the periphery of the disks, bars disposed between the brackets on the inner faces of the disks, bars extending between the brackets from one disk to the other, said bars and disks forming a skeleton frame for a polygonal receptacle, panels mounted on said bars to form the sides of said polygonal receptacle, one of said panels provided with an opening, a lid hingedly mounted in the last mentioned panel for closing said opening.

3. In a mixing machine of the class described, a pair of ground engaging disks, a plurality of brackets arranged concentrically about the center of the inner surface of the disk and spaced at equal intervals from each other and spaced inwardly from the periphery of the disks, bars disposed between the brackets on the inner faces of the disks, bars extending between the brackets from one disk to the other, said bars and disks forming a skeleton frame for a polygonal receptacle, panels mounted on said bars to form the sides of said polygonal receptacle, one of said panels provided with an opening, a lid hingedly mounted in the last mentioned panel for closing said opening, pintles extending through the centers of said disks and projecting beyond the outer surfaces thereof, a pair of rods, loops at the rear ends of said rods and engaged over the pintles, rollers on said rods engaging the outer surfaces of said disks, and a draft appliance engaged with the forward ends of said rods.

4. In a mixing machine of the class described, a pair of ground engaging disks, a plurality of brackets arranged concentrically about the center of the inner surface of the disk and spaced at equal intervals from each other and spaced inwardly from the periphery of the disks, bars disposed between the brackets on the inner faces of the disks, bars extending between the brackets from one disk to the other, said bars and disks forming a skeleton frame for a polygonal receptacle, panels mounted on said bars to form the sides of said polygonal receptacle, one of said panels provided with an opening, a lid hingedly mounted in the last mentioned panel for closing said opening, pintles extending through the centers of said disks and projecting beyond the outer surfaces thereof, a pair of rods, loops at the rear ends of said rods and engaged over the pintles, rollers on said rods engaging the outer surfaces of said disks, a draft appliance engaged with the forward ends of said rods, said draft appliance including a transversely extending means to which the forward ends of said rods are attached, a tongue pivoted to the center of said beam, and draft trees attached to said beam one on each side of said tongue.

5. A mixing machine of the class described including, in combination, a pair of ground engaging disks, a skeleton frame fixed between the disks, panels on said frame to form a receptacle with the disks, pintles extending thru the centers of said disks, a pair of rods having looped ends engageable with said pintles, rollers journaled on said rods and engaging the outer surface of said disks adjacent their peripheries, and a draft appliance attached to the other ends of said rods.

6. A mixing machine of the class described, including in combination, a pair of ground engaging disks, a receptable mounted between the disks, pintles extending through the centers of said disks, a pair of rods having looped ends engaged with said pintles, rollers journaled on said rods and engaging the outer surfaces of said disks adjacent their peripheries, and a draft appliance attached to the other ends of said rods.

In testimony whereof I affix my signature.

ORR BURGETT.